June 27, 1950 W. H. MARKS 2,512,954
STOCK PEN CLOSURE
Filed July 20, 1948
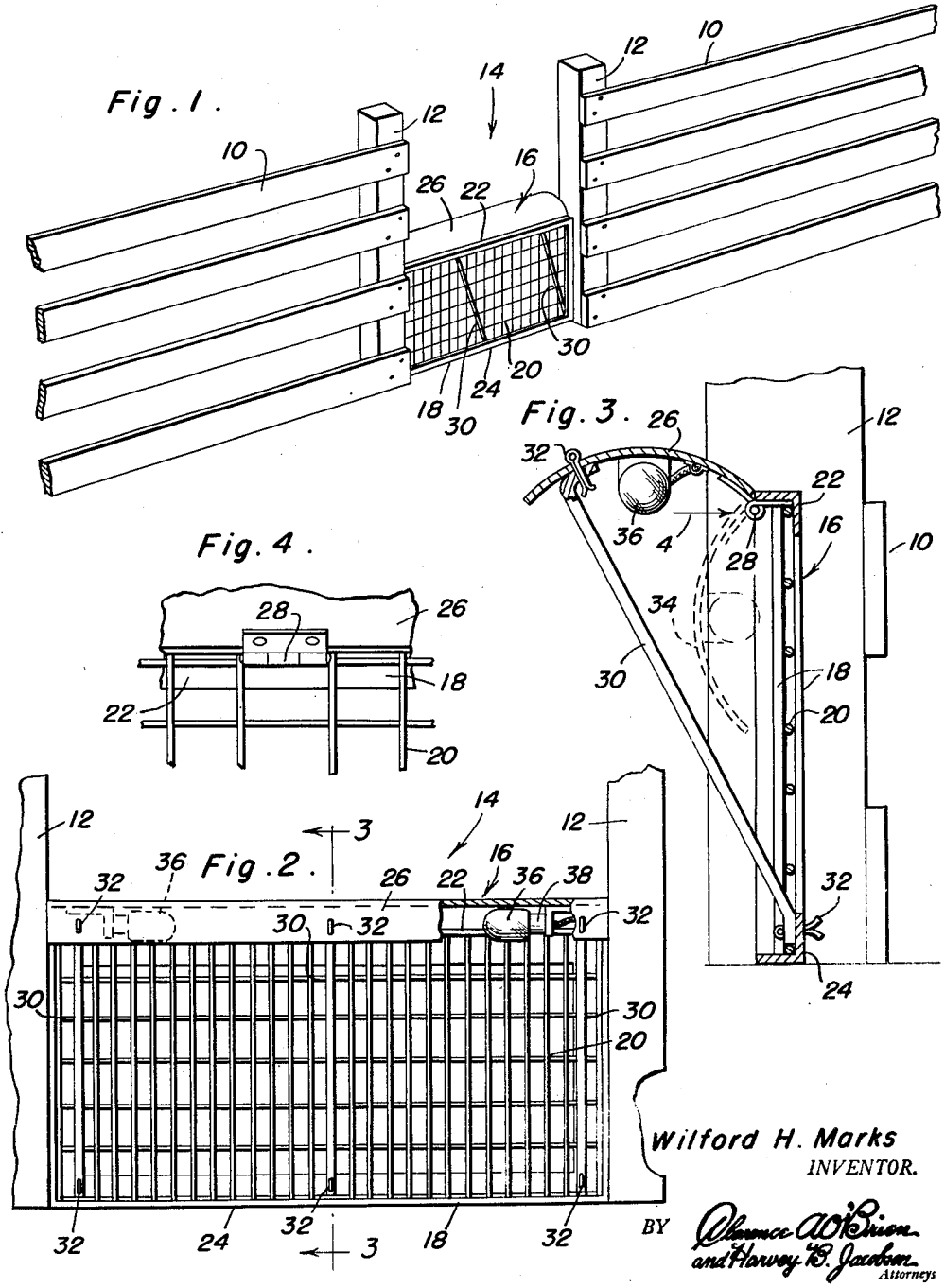
Wilford H. Marks
INVENTOR.

Patented June 27, 1950

2,512,954

UNITED STATES PATENT OFFICE 2,512,954

STOCK PEN CLOSURE

Wilford H. Marks, Lake Park, Iowa

Application July 20, 1948, Serial No. 39,638

2 Claims. (Cl. 119—155)

1

This invention relates to new and useful improvements and structural refinements in stock pens, more particularly, to pens for hogs, and the principal object of the invention is to retain young pigs within the pen while relatively older pigs, such as sows, may enter and leave the pen as they desire.

This object is achieved by the provision of what may be referred to as a closure for the opening or gate of the pen, matters being so arranged that young pigs are retained in the pen by the closure, while the latter may be readily surmounted by the relatively older animals.

An important feature of the invention resides in the provision of means for repelling the young pigs from the closure, so that they do not attempt to climb thereover, while the repelling means remain comparatively unobserved by the older animals.

A still further feature of the invention lies in the character of the repelling means mentioned in the preceding paragraphs, said means being visual rather than physical, so that the possibility of the young animals becoming injured, or the like, is prevented.

An additional feature of the invention resides in its collapsible nature, which permits the closure to be folded and readily transported or stored, when it is not in use.

An important advantage of the invention resides in its simplicity of construction and in its adaptability for use in stock pens of various sizes and types.

With the above more important objects and features in view, and such other objects and features as may become apparent as this specification proceeds, the invention consists essentially of the arrangement and construction of parts as illustrated in the accompanying drawings, in which:

Figure 1 is a fragmentary perspective view of a stock pen, showing the invention associated therewith;

Figure 2 is an inside elevational view of the invention in situ in a stock pen, the invention being shown as being partially broken away so as to reveal its construction;

Figure 3 is a cross sectional view, taken substantially in the plane of the line 3—3 in Figure 2; and, Figure 4 is a fragmentary elevational detail, taken substantially in the direction of the arrow 4 in Figure 3.

Like characters of reference are employed to designate like parts in the specification and throughout the several views.

Referring now to the accompanying drawings in detail, the reference character 10 designates a portion of a stock pen provided with a pair of spaced gate posts 12 defining what may be referred to as an entrance and exit opening 14, while the invention resides in the provision of what may be referred to as a closure designated generally by the reference character 16, whereby young animals such as pigs, or the like, are prevented from passing through, but whereby relatively older animals are permitted to pass through the opening 14, as will be hereinafter more fully described.

The closure 16 embodies in its construction a substantially rectangular frame 18 covered by a foraminous sheet, such as for example, by a screen 20, the frame 18 including upper and lower angle members 22, 24, respectively, as will be clearly apparent.

An arcuate shield 26 is hingedly connected at one end thereof as at 28 to the upper member 22 of the frame 18, and a plurality of supporting rods 30 extend between the free edge portion of the shield 26 and the lower member 24, as is best shown in Figure 3.

The end portions of the rods 30 are angulated so as to lie flat against the inner surface of the shield 26 and against the member 24 of the frame 18, the rods 30 being held in position by suitable fastening elements such as the cotter pins 32, whereby the entire closure may be readily folded so that after the rods 30 are removed, the shield 26 may be collapsed to a position shown by the phantom line 34 in Figure 3, when the invention is not in use.

The closure 16 is, of course, intended for removable positioning in the opening 14 between the posts 12, in which connection it should be noted that the closure is of substantially lesser height with respect to the fence 10, so that relatively large animals are free to enter and leave the pen by simply jumping over the closure, while the relatively young animals are confined within the closure, being unable to surmount the foraminous wall 20, particularly in the presence of the aforementioned shield 26. The latter, of course, extends into the pen, so that passage of young animals thereover is virtually impossible.

The essence of novelty in the invention resides in the provision of a plurality of electric lamps 36 mounted in suitable sockets 38 secured to the underside of the shield 26, the light ray emanating from the lamps being directed downwardly by the shield 26 so as to repel small animals from the closure 16 into the pen 10 and thereby discourage them from attempting to surmount the closure. (It has been found that electric lights employed in this manner frighten small animals such as pigs, causing them to remain at a distance from the light source.)

However, it is to be noted that the relatively older and larger animals are sufficiently tall so that their eyes are disposed at a higher level than the shield 26, whereby the light rays emanating from the lamps 36 do not reach the eyes of the larger animals and the latter are not discouraged from surmounting the closure 16.

Needless to say, the closure 16 may be temporarily or permanently secured between the gate posts 12 in any suitable manner.

It is believed that the advantages and use of the invention will be clearly apparent from the foregoing disclosure, and, accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

1. In a stock pen, the combination of a pair of spaced fence posts, a closure wall extending between said posts, an inwardly extending shield provided at the upper edge of said wall, and an electric lamp mounted under said shield for downward and inward projection of animal repelling light.

2. The device as defined in claim 1 together with hinges provided at the upper edge of said wall for attaching said shield thereto, whereby the shield may be swung downwardly toward the wall for protecting said lamp, and removable struts extending diagonally from said wall to said shield for supporting the latter in an operative position.

WILFORD H. MARKS.

REFERENCES CITED

The following references are of record in the file of this patent:

UNITED STATES PATENTS

| Number | Name | Date |
|--------|------|------|
| 454,026 | Brayton | June 16, 1891 |
| 1,630,105 | Bernard | May 24, 1927 |
| 1,835,374 | Burchett | Dec. 8, 1931 |